US009558072B1

(12) United States Patent
Mam (10) Patent No.: US 9,558,072 B1
(45) Date of Patent: Jan. 31, 2017

(54) BLOCK-LEVEL INCREMENTAL RECOVERY OF A STORAGE VOLUME (71) Applicant: EMC Corporation, Hopkinton, MA (US)

(72) Inventor: Neelabh Mam, Bangalore (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 463 days.

(21) Appl. No.: 14/039,141

(22) Filed: Sep. 27, 2013

(51) Int. Cl.
G06F 17/30 (2006.01)
G06F 11/14 (2006.01)

(52) U.S. Cl.
CPC ....... *G06F 11/1451* (2013.01); *G06F 11/1469* (2013.01); *G06F 17/30286* (2013.01); *G06F 17/30575* (2013.01)

(58) Field of Classification Search
CPC .............. G06F 17/30286; G06F 11/1469
See application file for complete search history.

(56) References Cited

U.S. PATENT DOCUMENTS

| 6,073,128 A * | 6/2000 | Pongracz | G06F 11/1469 707/640 |
| 7,809,691 B1 * | 10/2010 | Karmarkar | G06F 11/1469 707/674 |
| 8,918,606 B1 * | 12/2014 | Stringham | G06F 12/0223 711/162 |
| 9,009,114 B1 * | 4/2015 | Sridharan | G06F 11/1448 707/646 |
| 2005/0216788 A1 * | 9/2005 | Mani-Meitav | G06F 11/1456 714/6.32 |
| 2008/0052427 A1 * | 2/2008 | Levy | G06F 11/1456 710/62 |
| 2011/0196840 A1 * | 8/2011 | Barzilai | G06F 11/1458 707/645 |
| 2011/0218966 A1 * | 9/2011 | Barnes | G06F 17/30079 707/645 |
| 2013/0080397 A1 * | 3/2013 | Payne | G06F 17/30286 707/681 |
| 2013/0110783 A1 * | 5/2013 | Wertheimer | G06F 11/14 707/646 |

* cited by examiner

Primary Examiner — Mohammad S Rostami
(74) Attorney, Agent, or Firm — Polsinelli PC (57) ABSTRACT

A source volume is restored to the time of a selected incremental backup volume without writing over all of the data blocks in the source volume. If the source volume has valid data blocks and there are valid records of the changes to these valid data blocks and the valid records are consistent with the state of the source volume and indicate that certain valid data blocks did not change since the selected incremental backup, then the restoration does not write over the valid data blocks that did not change since the selected incremental backup. Otherwise, data blocks are recovered from the selected incremental backup and one or more backups prior to the selected incremental backup. For example, data blocks are recovered by scanning incremental backups in reverse chronological order to find the most recent version of the block in these backups.

14 Claims, 8 Drawing Sheets

BLOCK-LEVEL INCREMENTAL RECOVERY OF A STORAGE VOLUME

FIELD OF THE INVENTION

The various embodiments described herein relate generally to block-level incremental recovery of a storage volume, and in particular to a way of reducing the time for a full restoration of the storage volume to the time of a selected incremental backup.

BACKGROUND

In today's computing environments, it is often desirable to backup computer data by copying and archiving the data (e.g., creating a backup image) so that the data may be restored after a data loss event (e.g., hardware failure, etc.). There are at least two types of backup applications that are implemented in this regard. File-level backup applications copy data from a source location to a backup location on a file-by-file basis regardless of where the data of the file is physically stored. This means that the backup application attempts to build and replicate the original file by reading the logical file system present on the original location. The granularity of the resulting backup entities for file-level backups is therefore individual files. Block-level backup applications, on the other hand, bypass the file system and perform backups of entire volumes of data from the original location.

One advantage of bypassing the file system for a block-level backup that there is no penalty in performance in cases where the original location contains large numbers of files (such performance impacts may take place if file-level backup were to be used). As a result of bypassing the file system, the granularity of the resulting backup entity for block-level backups is therefore the entire volume's image (i.e., binary image). Another advantage of bypassing the file system is that for certain storage volumes, a file-level backup will not capture all of the data of interest on the storage volume. For example, file-level backup may not capture data from proprietary data structures that are not contained in files of a file system built and exposed on the storage volume. Such data structures are found, for example, in various Microsoft WINDOWS™ brand operating systems and Microsoft EXCHANGE™ brand e-mail systems.

A way of block-level backup is to make and archive a full backup of a source volume on a periodic basis, and to make and archive an incremental backup of the source volume on a more frequent basis. A differential backup is another name for an incremental backup. For example, a full backup is made on a weekly basis, at 2:00 a.m. on Sunday, and an incremental backup is otherwise made on a daily basis, at 2:00 a.m. on Monday, Tuesday, Wednesday, Thursday, Friday, and Saturday. Each incremental backup includes only the blocks of data that have changed in the source volume since the previous backup. Each incremental backup also identifies all of the changed blocks. The incremental backup includes a changed block map that identifies the changed blocks, and the changed block map is a block bitmap or an extent map. A block bitmap includes a bit for each block of the source volume, and a bit set to indicate that a corresponding block of data that has changed in the source volume since the previous backup. An extent map includes entries for extents of contiguous blocks of data that have changed in the source volume since the previous backup. For example, each extent entry includes an offset and length for a corresponding extent, and the extent entries are arranged in a list sorted by offset.

For recovery from certain data loss events, it is desired to restore a source volume to a prior state existing at the time of a selected one of a plurality of available incremental backups of the source volume. The selected incremental backup may or may not be the most recent incremental backup. A case is recovery from data corruption caused by installation of a malicious or defective computer program. For example, data corruption from a virus could be detected after a few incremental backups have been made since the installation of the virus, and in this case one would select the most recent incremental backup made before the installation of the virus.

A conventional way of restoring a source volume to the time of a selected incremental backup involves copying blocks to the source volume from the most recent full backup made before the time of the selected incremental backup, and then copying blocks to the source volume from any and all incremental backups that were made between the time of this full backup and the selected incremental backup, and then copying blocks to the source volume from the selected incremental backup. These backups are copied successively to the source volume in chronological order of the backups, beginning with a full restoration of the source volume with the full incremental backup, and ending with the copying of blocks from the selected incremental backup to the source volume.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Although the process flows shown in the figures or contained in following description may depict functional operations in a particular sequence, the processes are not necessarily limited to the particular order or operations illustrated. One skilled in the art will appreciate that the various operations portrayed in the figures can be changed, rearranged, performed in parallel or adapted in various ways. Furthermore, it is to be understood that certain operations or sequences of operations can be added to or omitted from the processes, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

Figure 1:
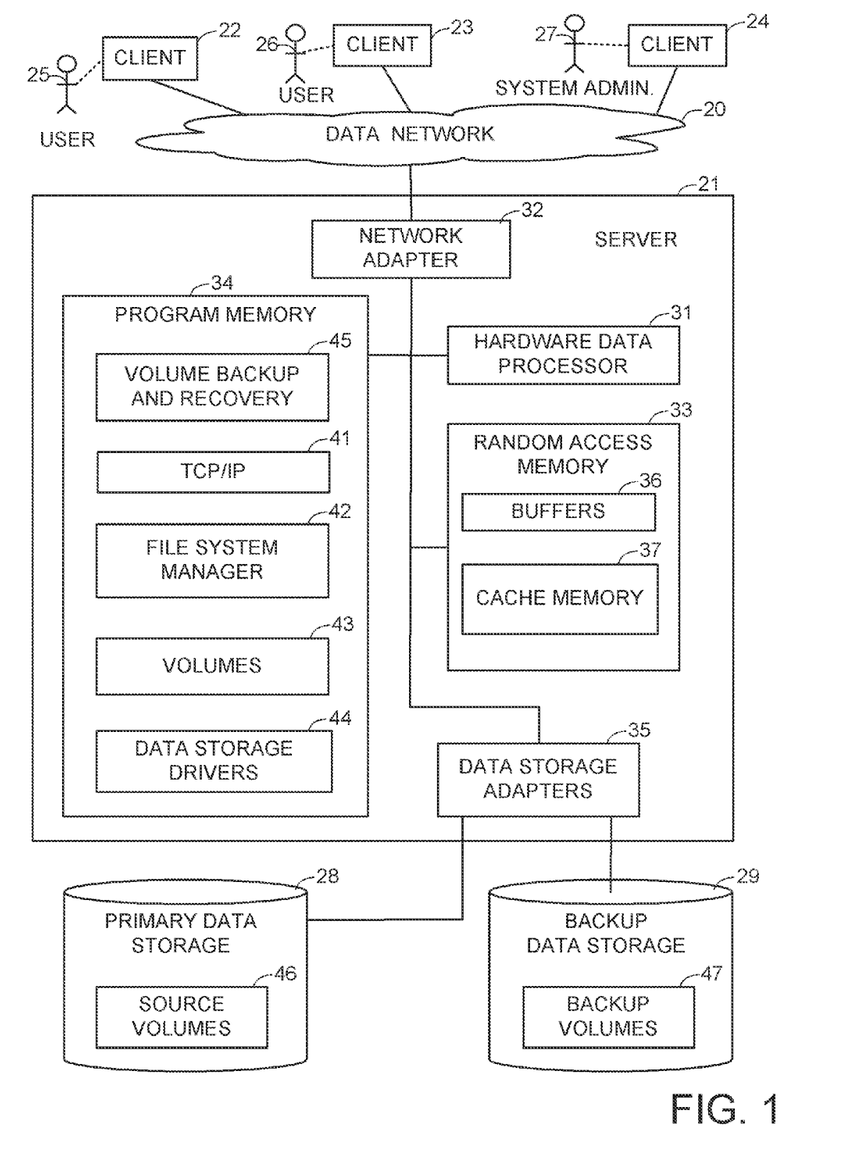
FIG. 1 illustrates a data network including a server providing clients with access to data storage.

FIG. 1 shows a data network 20 including a server 21 for servicing requests from network clients 22, 23, 24 for access to source volumes 46 in primary data storage 28. The network clients 22, 23, 24, for example, are workstations operated by respective human users 25, 26, 27. The primary data storage 28, for example, is an array of disk drives. The server 31 also has access to backup data storage 29 storing backup volumes 47 of data from the source volumes 46. The backup data storage 29 may use the same kind of data storage devices as the primary data storage 28, or the backup data storage 29 may use data storage devices that are slower and less expensive than the data storage devices used for the primary data storage 28.

The server 21 includes a hardware data processor 31, a network adapter 32 linking the data processor to the data network 20, random access memory 33, program memory 34, and data storage adapters 35 linking the data processor to the primary data storage 28 and the backup data storage 29. The data storage adapters 35, for example, are Fibre-Channel (FC), Small Computer Systems Interface (SCSI), or Internet Protocol SCSI (iSCSI) host bus adapters. The data processor 31 is a general purpose digital computer data processor including one or more core central processing units (CPUs) for executing computer program instructions stored in the program memory 34. The program memory 34 is a non-transitory computer readable storage medium, such as a local magnetic hard disk drive, or electrically erasable and programmable read-only memory (EEPROM). The random access memory 33 includes buffers 36, and cache memory 37 for paging data from the primary data storage 28 or the backup data storage 29.

The program memory 34 includes a program layer 42 for network communication using the Transmission Control Protocol (TCP) and the Internet Protocol (IP). The program memory 34 also includes a file system manager 42 for responding to client requests for access to files in file systems, and a logical volumes layer 43 providing access to logical volumes upon which the file systems are built. The logical volumes include the source volumes 46 and the backup volumes 47. For example, each logical volume is configured from one or more logical unit numbers (LUNs) of either the primary data storage data storage 28 or the backup data storage 29, and the logical volumes layer 43 translates logical block numbers from the file system manager 42 to the LUNs where the desired blocks of storage are found.

The various embodiments described herein relate generally to volume backup and recovery programs 45 executed by the data processor 31 to produce the backup volumes 47 from data of the source volumes 46, and to restore a selected source volume to the time of a selected one of the backup volumes that was produced from data of the source volume.

Figure 2:
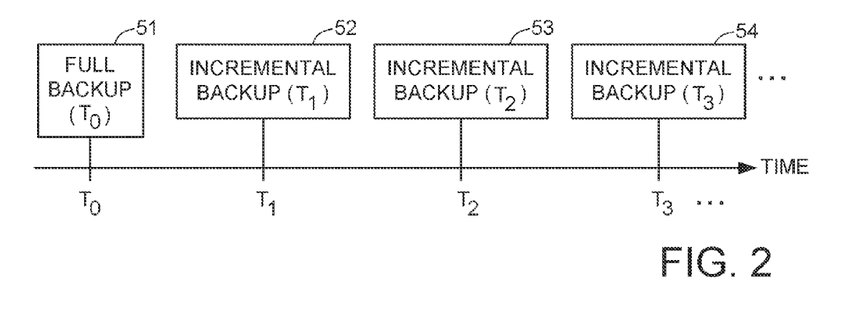
FIG. 2 illustrates a backup schedule including a full backup followed by a chronological series of incremental backups.

FIG. 2 illustrates a backup schedule producing a chronological series of backups of a source volume. The backups include a full backup 51 a time $T_0$ followed by incremental backups 52, 53, 54 at respective times $T_1$, $T_2$, $T_3$, etc. Once a backup volume is made on the backup data storage, an archive copy of the backup volume may be stored on magnetic tape or optical disk. After a certain period of time, the backup volume may be deleted from the backup data storage 29.

Figure 3:
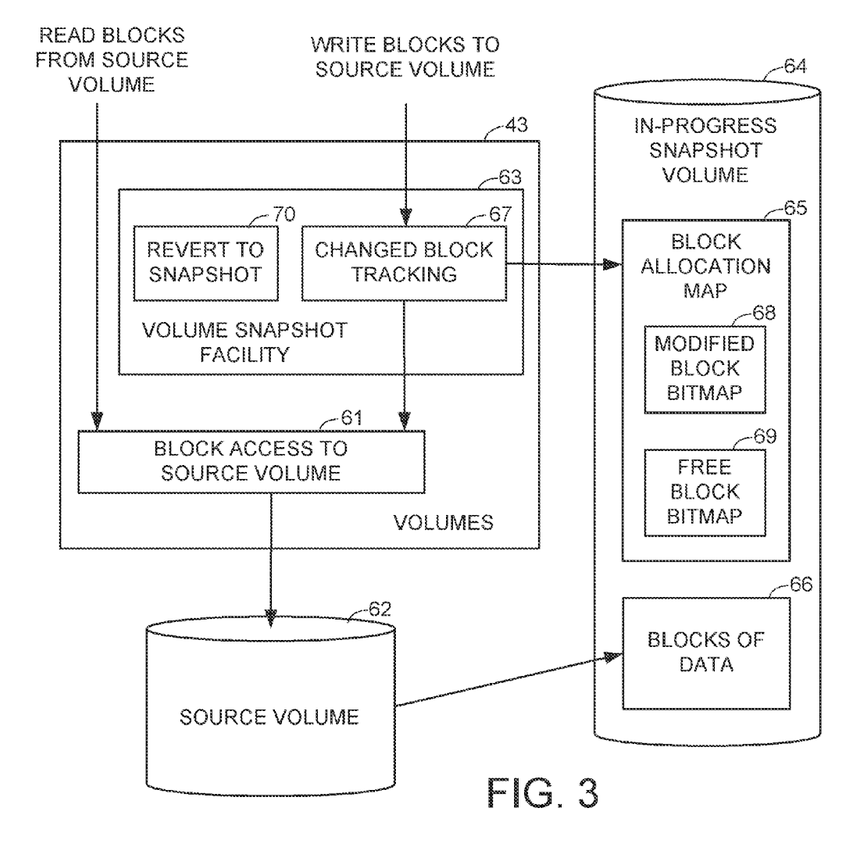
FIG. 3 illustrates a volume snapshot facility producing a snapshot volume from a source volume.

FIG. 3 shows a volume snapshot facility 43 producing a snapshot volume 64 from a source volume 62. The volume snapshot facility 42 operates at the volume level of the logical volumes facility 43 to intercept volume write requests from higher levels. Upon intercepting such a write request directed to a specified block of the source volume 62, a changed block tracking driver 67 accesses a block allocation map 65 in the snapshot volume 64 to determine whether or not the specified block has been changed since the time that the snapshot process began upon the snapshot volume 64. For example, the block allocation map 65 includes a modified block bitmap 68 in which a respective bit for each block is either a logical zero indicating that the block has not been changed since the time of the snapshot, or else is a logical 1 indicating that the block has been changed since the time of the snapshot.

If the block allocation map 65 indicates that the block has been changed since the time of the snapshot, then the write request is passed to the block access routine 61 of the logical volumes facility 43, and new data is written to the specified data block in the normal fashion. Otherwise, if the block allocation map 65 indicates that the block has not changed since the time of the snapshot, then the volume snapshot facility 63 performs a "copy upon first write" by copying the "before image" of the specified block from the source volume 62 to the snapshot volume 64. Once this copy operation has been completed, the volume snapshot facility sends the new data for the specified block down to the block access routine 61, and this new data is written to the specified block of the source volume.

For example, the snapshot volume 64 includes a block data region 66 for storing "before image" block data, and a free block bitmap 69 for storing "before image" block metadata about the block allocation state. The snapshot volume 64 may conform to the Microsoft Virtual Hard Disk Image Specification (Oct. 11, 2006—Version 1.0). In this case, "a copy upon first write" upon a specified block includes checking the allocation state of the specified block in the source volume, and if the allocation state in the source volume indicates that the specified block is free, then the "copy upon first write" is finished because the free block bit map 69 has an initial state, at the start of the snapshot process, indicating that all blocks of the snapshot volume 64 are free. Otherwise, if the allocation state in the source volume indicates that the specified block is allocated, then a data block in the region 66 is allocated, the corresponding bit in the free block bitmap 69 is set, and the data of the corresponding block is copied from the source volume 62 to the allocated data block in the region 66.

To make full and incremental backups from the source volume 62, a series of at least two snapshot volumes are kept during client access to the source volume 62. For example, to make a backup copy at a present time $T_B$, a snapshot process in progress at this time $T_B$ is terminated upon an old snapshot volume ($T_{B-1}$), and a snapshot process is begun upon a new snapshot volume ($T_B$). Then, after the time $T_B$, a full backup volume ($T_B$) is created by copying the "before image" blocks from the new snapshot volume ($T_B$) to a backup volume, or else copying the blocks (which have not changed since $T_B$) from the source volume, so that the full backup includes a copy of every allocated block that was in the source volume 62 at the time $T_B$.

After the time $T_B$, an incremental backup volume ($T_B$) is created in the same way that the full backup volume ($T_B$) except that the incremental backup volume only includes block data or metadata for the blocks indicated as modified by the modified bitmap from the snapshot volume ($T_{B-1}$). For example, the incremental backup volume ($T_B$) has the same modified bitmap as the snapshot volume ($T_{B-1}$). Thus, the old snapshot volume ($T_{B-1}$) can be converted to an incremental backup volume ($T_B$) by replacing the old block metadata and old block data in the old snapshot volume with new block metadata and new block data from the new snapshot volume or else from the source volume. A full or incremental backup volume may also conform to the Microsoft Corp. Virtual Hard Disk Image Specification (Oct. 11, 2006—Version 1.0).

The volume snapshot facility 63 may also have a "revert to snapshot" function 70 for restoring the source volume to the "in progress" snapshot copy. Such a "revert to snapshot" function scans the modified block bitmap 68 to restore the modified blocks of the source volume with the block data and metadata from the block data region 68 and the free block bitmap 69. For example, such a "revert to snapshot" function is included in the Microsoft Corp. Volume Shadow Copy Service (VSS).

The various embodiments disclosed herein use the incremental backup volumes to restore the source volume to the time of a selected incremental backup volume without writing over all of the data in the source volume. If the source volume has valid data blocks and there are valid records of the changes to these data blocks and these valid records are consistent with the state of the source volume, then there is no need for the restoration to write over any of these data blocks that have not been changed since the time of the selected incremental backup. Therefore the source volume is restored more quickly by eliminating the time of writing these data blocks that have not changed since the time of the selected incremental backup.

Figure 4:
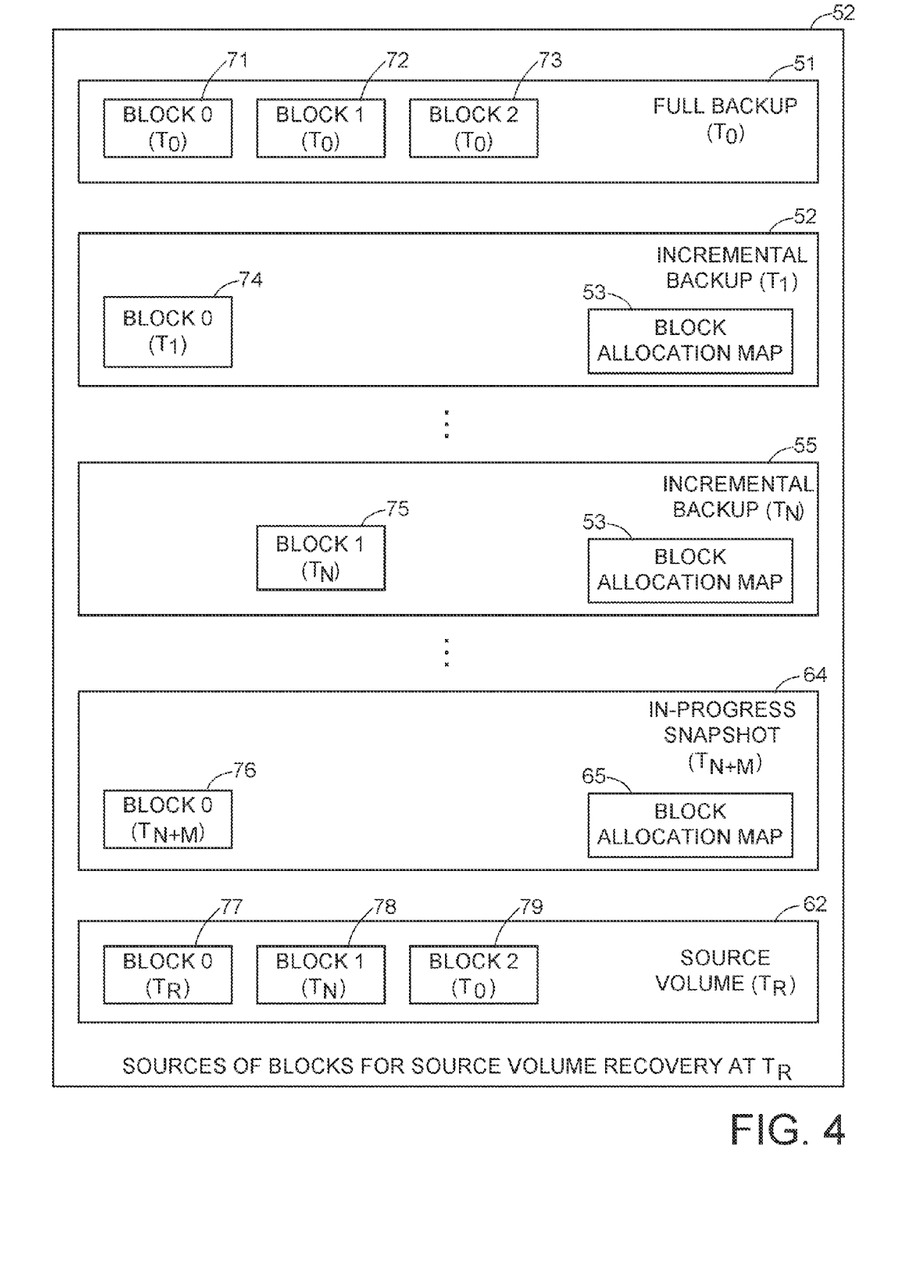
FIG. 4 illustrates sources of blocks for recovery of the source volume.

FIG. 4, for example, shows the available sources of blocks for restoration of the source volume 82 at a recovery time $T_R$ for the general case of restoration to the time $T_N$ of a selected incremental backup 56. These sources include the source volume 82 itself at time $T_R$, the in-progress snapshot volume 64 at time $T_{N+M}$, the most recent full backup 51 of the source volume at time $T_0$, and the series of incremental backups of the source volume at the respective times $T_1$, $T_2$, . . . , $T_N$, etc. beginning with the first incremental backup 52 at time $T_1$. In general, if the source volume 62 at time $T_R$ has valid data and the changed block tracking data in the block allocation map 65 of the snapshot volume 54 is valid and consistent with the state of the source volume 62 at time $T_R$, then it may be possible to use at least some of the valid data in the source volume during restoration of the source volume to the time $T_N$ of the selected incremental backup 55.

A usual case where the source volume has valid data yet it should be restored to the state of a selected incremental backup ($T_N$) is when a virus, a defective program, or defective data has been introduced into the data network after the time $T_N$, and as a result some of the data in the source volume may have been corrupted, yet the changed block tracking data for the source volume since the time $T_N$ has not been compromised. The changed block tracking data since the time $T_N$ can be used to identify blocks of the source volume that have and have not been changed since the time $T_N$. This change block tracking data is found in the block tracking data of the block allocation map 65 of the in-progress snapshot volume 64 and in the block allocation maps of any and all incremental backups of the snapshot volume after the selected incremental backup 55 at the time $T_N$. Consequently, the blocks of the source volume that have not been changed since the time $T_N$ have not been affected by data corruption. Therefore, when the systems administrator has found data corruption in the data network, the source of the data corruption is investigated to identify the data storage volumes that are likely to be affected. Because the backup data storage is segregated from the primary data storage and has stricter access privileges, there is a good chance that data corruption will be limited to the primary data storage.

If the data corruption has not affected the change block tracking of the source volume, then the source volume is restored with data in the source volume itself, the change block tracking of the source volume since the selected incremental backup, the most recent full backup made from the source volume prior to the selected incremental backup, and any and all incremental backups made from the source volume between the time of the full backup and the selected incremental backup. The changed block tracking of the source volume 62 since the selected incremental backup volume 55 includes the change block tracking data in the block allocation map 65 of the in-progress snapshot copy volume 64 and in the block allocation maps of any and all incremental backup volumes of the source volume since the time $T_N$ of the selected incremental backup volume 55. For example, if a block in the source volume is invalid or the changed block tracking data indicates that the block in the source volume has been changed since the time of the selected incremental backup 55, then the block is recovered by copying, to the source volume 62, the data or metadata of the block from the last one of the backups, up to time of the selected incremental backup, that has data or metadata of the block.

For the example of FIG. 4, for the case of block 0 of the source volume 62, the data block 77 in the source volume at time $T_R$ is not used for restoration of the source volume to the time $T_N$ because the changed block tracking data in the in-progress snapshot 64 would indicate that block 0 has changed since the time $T_{N+M}$ because the in-progress snapshot 64 includes a "before-image" 76 of block 0. Therefore block 0 is recovered by copying, to the source volume, the data block 74 in the incremental backup volume 52 because the incremental backup volume 52 is the last one of the backups, up to time $T_N$ of the selected incremental backup 55, that has data or metadata of block 0.

For the example of FIG. 4, for the case of block 1 and block 2, the blocks 78 and 79 in the source volume 62 at time $T_R$ would not be changed during the restoration of the source volume to the time $T_N$ because the changed block tracking data in the block allocation map of the in-progress snapshot 64 (and in any and all incremental backups of the source volume since the time $T_N$") would indicate that blocks 1 and 2 had not been changed in the source volume since the time $T_N$. In particular, as shown in FIG. 4, block 1 was last changed in the source volume 62 during the time interval from $T_{N-1}$ to $T_N$, and block 2 was last changed in the source volume before the time $T_0$.

The recovery method may use backups from a conventional backup facility of the kind that makes a snapshot copy of the source volume at a next scheduled time for a next backup, as described above with reference to FIG. 3. In this case the recovery method may include initially invoking the backup facility to complete pending read-write operations upon the source volume, suspend further user-level read-write access to the source volume, and finish a last incremental backup that is consistent with a final state of the source volume, or else restore the state of the source volume to the time of the previous backup. If the source volume is not made consistent with an incremental backup or a changed block map of the backup facility, then data in the source volume is not used for the restoration to the time of the selected incremental backup. Otherwise, if a block of the source volume has changed since the time of the selected incremental backup, then the block is recovered by copying, to the source volume, data or metadata of the block from the most recent one of the backups, up to time $T_N$ of the selected incremental backup, that has data or metadata of the block. This most recent one of the backups up to the time $T_N$ has the most recent version of the block up to the time $T_N$.

Figure 5:
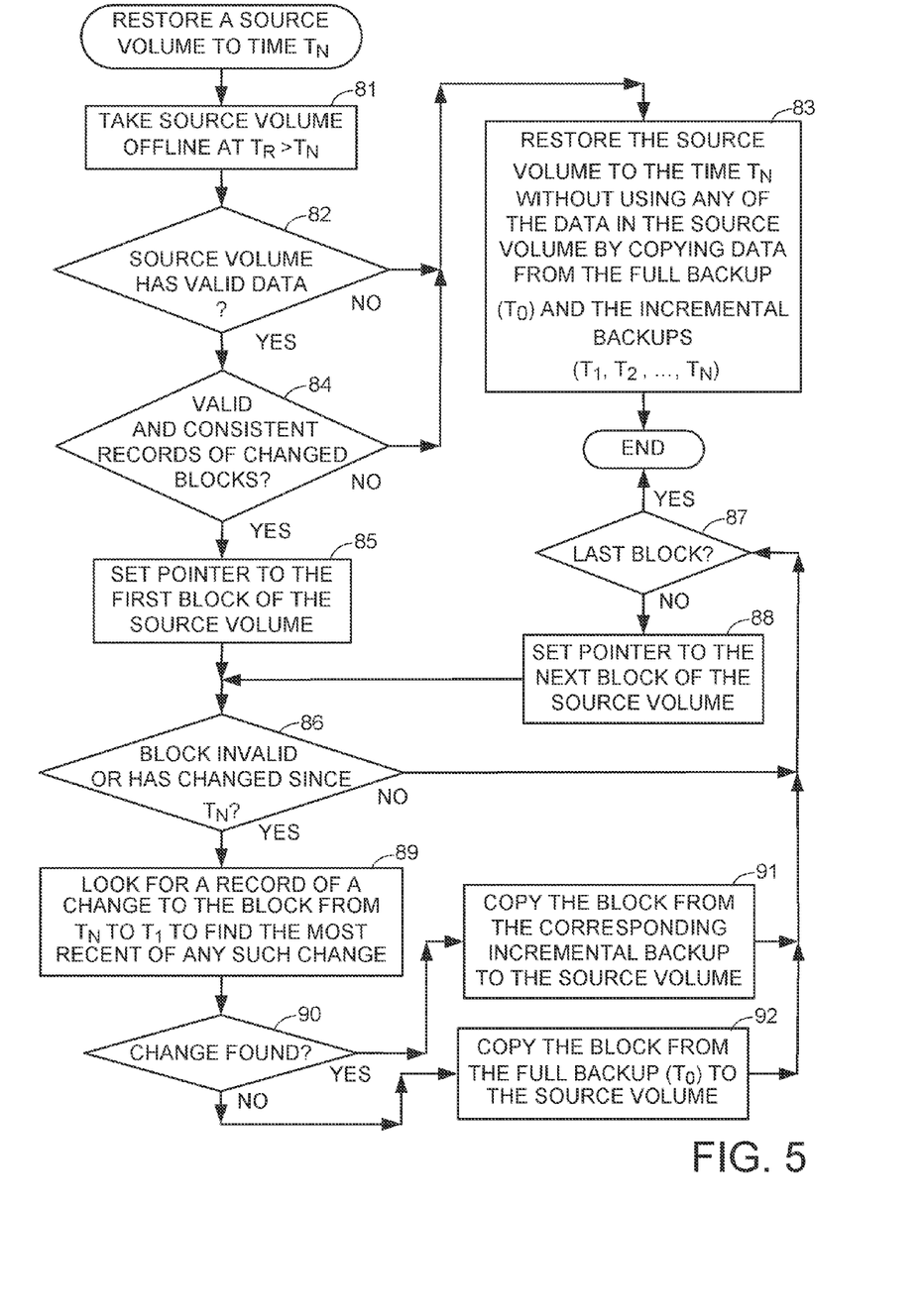
FIG. 5 illustrates a procedure for restoration of the source volume to the state of a selected backup, in accordance with various embodiments.

FIG. 5 shows an example of a procedure for restoration of the source volume to the state of the selected incremental backup $T_N$, in accordance with various embodiments. In a first block 81, the source volume is taken offline at the recovery time $T_R$. This is done in a controlled fashion so that in the usual case the data resulting on the source volume will be consistent with the final state of the snapshot change block tracking data. For the case of the Microsoft VSS snapshot copy facility, a convenient way of doing this is to invoke the snapshot copy facility to initiate a final VSS snapshot of the source volume. Invocation of the snapshot copy facility temporarily prevents new write requests to the source volume from being processed, and allows pending write requests to the source volume to be completed, so that the source volume achieves a quiescent state. When this final snapshot is just about to be completed and before the operating system resumes writes to the volume, the volume is taken offline from inside the changed block tracking driver. This makes the file system data structures on the source volume consistent, and also ensures that the source volume will not take any further writes from network clients after this final snapshot. Once the source volume is brought offline, the source volume is opened in exclusive write mode for starting the process of writing selected blocks to the source volume from the backup volumes in order to perform the block level incremental restoration.

Then, in block 82, if the source volume does not have valid data, then execution branches to block 83. This would occur if all of the data storage devices including the LUNs of the source volume have been destroyed, or if the logical-to-physical block mapping metadata of the source volume has been corrupted, resulting in the logical volumes layer returning an error upon an attempted access to the source volume. For example, in this case the data storage devices would be replaced and the source volume would be reconfigured, and then data for the reconfigured source volume would be recovered in block 83.

Figure 9:
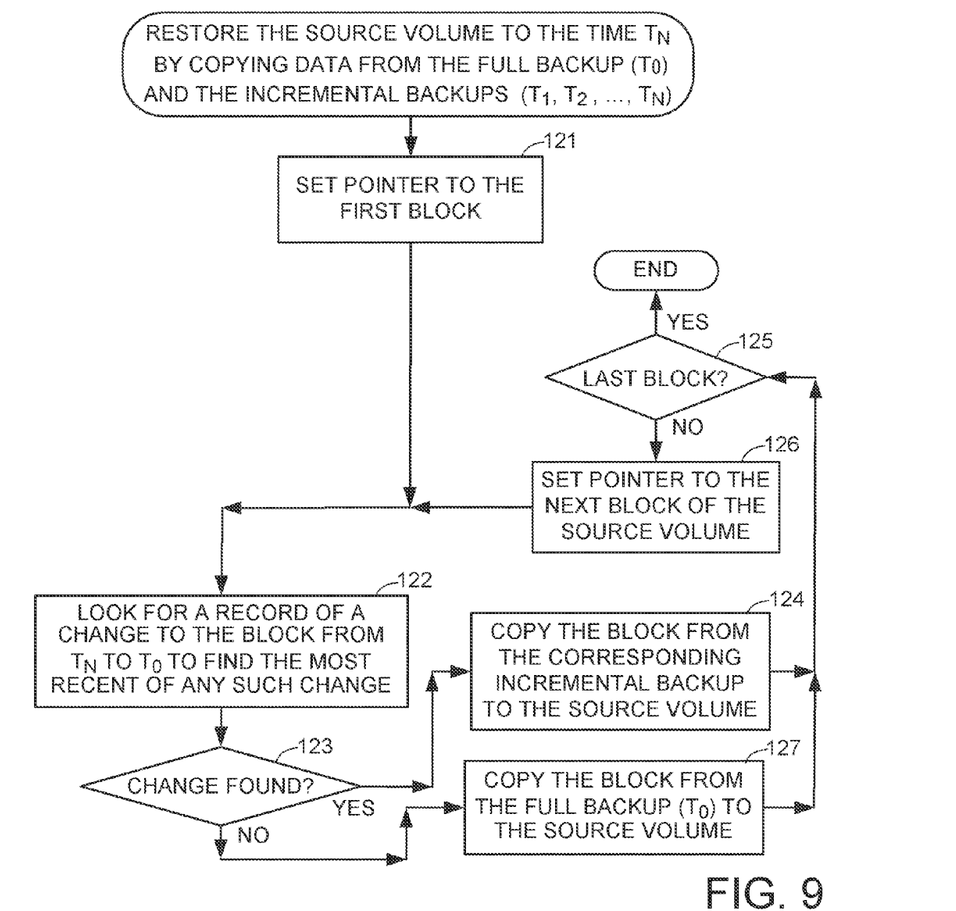
FIG. 9 illustrates a procedure for restoring the source volume to the state of a selected backup without using any of the data in the source volume.

In block 83, the source volume is restored to the time $T_N$ without using any of the data in the source volume at $T_R$ by copying data from the full backup ($T_0$) and the incremental backups ($T_1, T_2, \ldots, T_N$) since the full backup up to including the selected incremental backup ($T_N$). This can be done in a conventional way by copying these backups successively to the source volume in the chronological order of the backups, beginning with a full restoration of the source volume with the full incremental backup, and ending with the copying of the blocks from the selected incremental backup to the source volume. Alternatively, this could be done as shown in FIG. 9 and further described below. After block 83, the restoration is finished.

If block 82 finds that the source volume has valid data, then execution continues to block 84. If there are not valid and consistent records of changed blocks for the valid data in the source volume, then this valid data in the source volume is not used for the restoration of the source volume, and execution branches to block 83. Otherwise, execution continues from block 84 to block 85. For the example of FIG. 4, execution continues from block 84 to block 85 occurs when the changed block tracking data in the block allocation map of the in-progress snapshot and in all of the incremental backups since the time $T_N$ is valid and consistent with the state of the source volume at the recovery time $T_R$. In other words, the changed block tracking data has not been corrupted, and the snapshot copy facility has not been disrupted so that the changed block tracking data in the in-progress snapshot 64 is consistent with the state of the source volume at the recovery time $T_R$.

Figure 7:
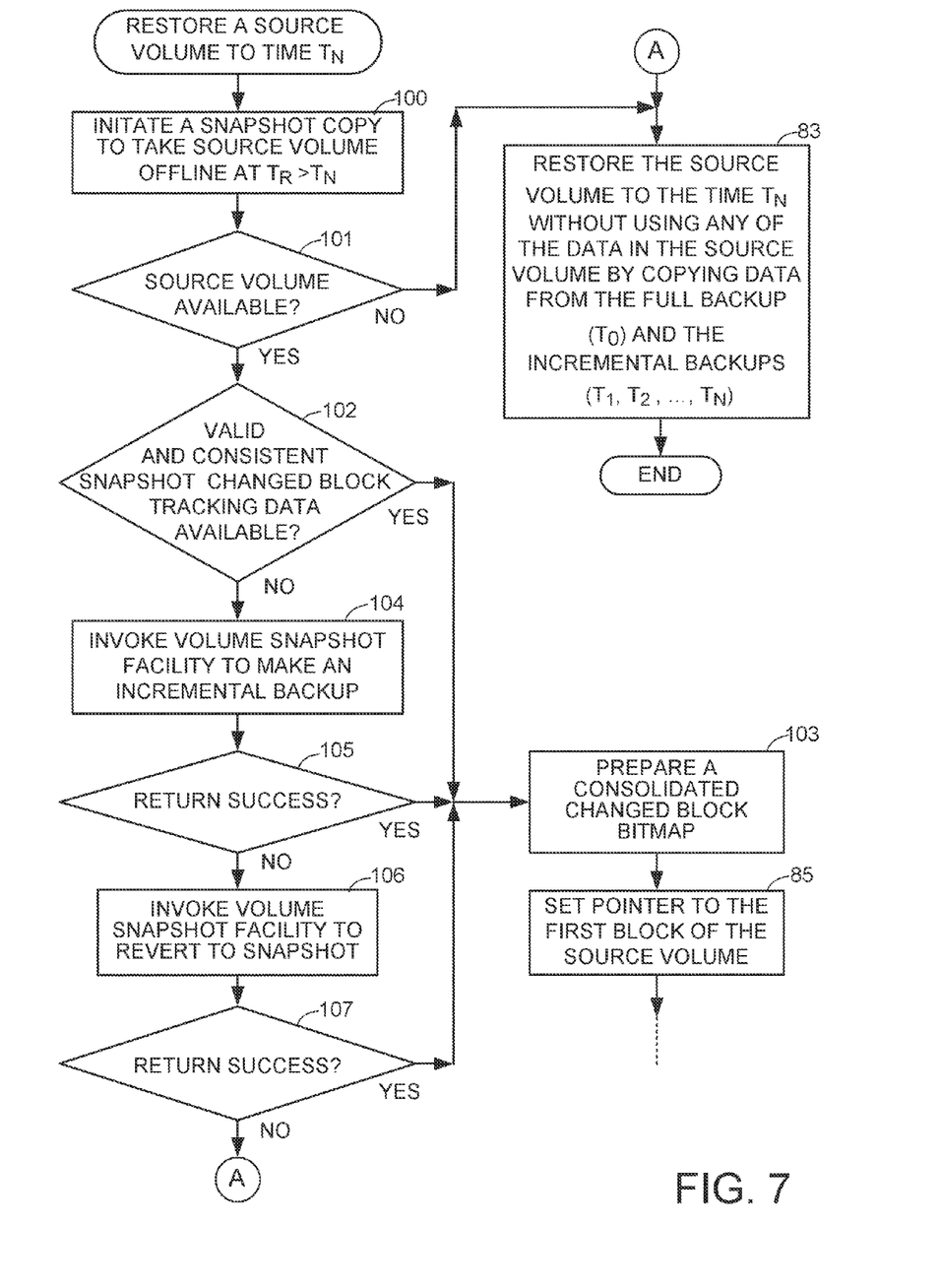
FIG. 7 illustrates various ways of performing certain methodologies in FIG. 5.

Often a valid changed block tracking data in the in-progress snapshot copy facility will be consistent with the state of the source volume at the recovery time $T_R$ unless there has been a "crash and reboot" of the server and upon reboot the conventional write logging techniques cannot recover from disrupted write operations to the source volume and to the in-progress snapshot volume. If a conventional snapshot copy facility were used, then the presence of such disruption could be detected by instructing the snapshot copy facility to revert to the in-progress snapshot, or by instructing the snapshot copy facility to produce an incremental backup at the present time. A specific example of this is shown in FIG. 7 and further described below. If the snapshot copy facility can revert to the in-progress snapshot, or produce an incremental backup at the present time, then all of the changed block tracking data since the time $T_N$ up to the time $T_R$ should be consistent with the state of the source volume at the time $T_R$, so that execution may continue from block 84 to block 85.

In block 85, a pointer is set to point to the first block of the source volume. This is done in preparation of scanning the blocks of the source volume, in order to successively recover each block of the source volume. In block 86, if the block is not invalid and has not changed since the time $T_N$, then the block presently in the source volume can be used for the block in the recovered source volume, and execution branches to block 87. If the pointed-to block is the last block of the source volume, as tested in block 87, then the entire source volume has been recovered, and the recovery is finished. Otherwise, execution continues from block 87 to block 88 to set the pointer to point to the next block of the source volume. Execution loops back from block 88 to block 86.

Figure 8:
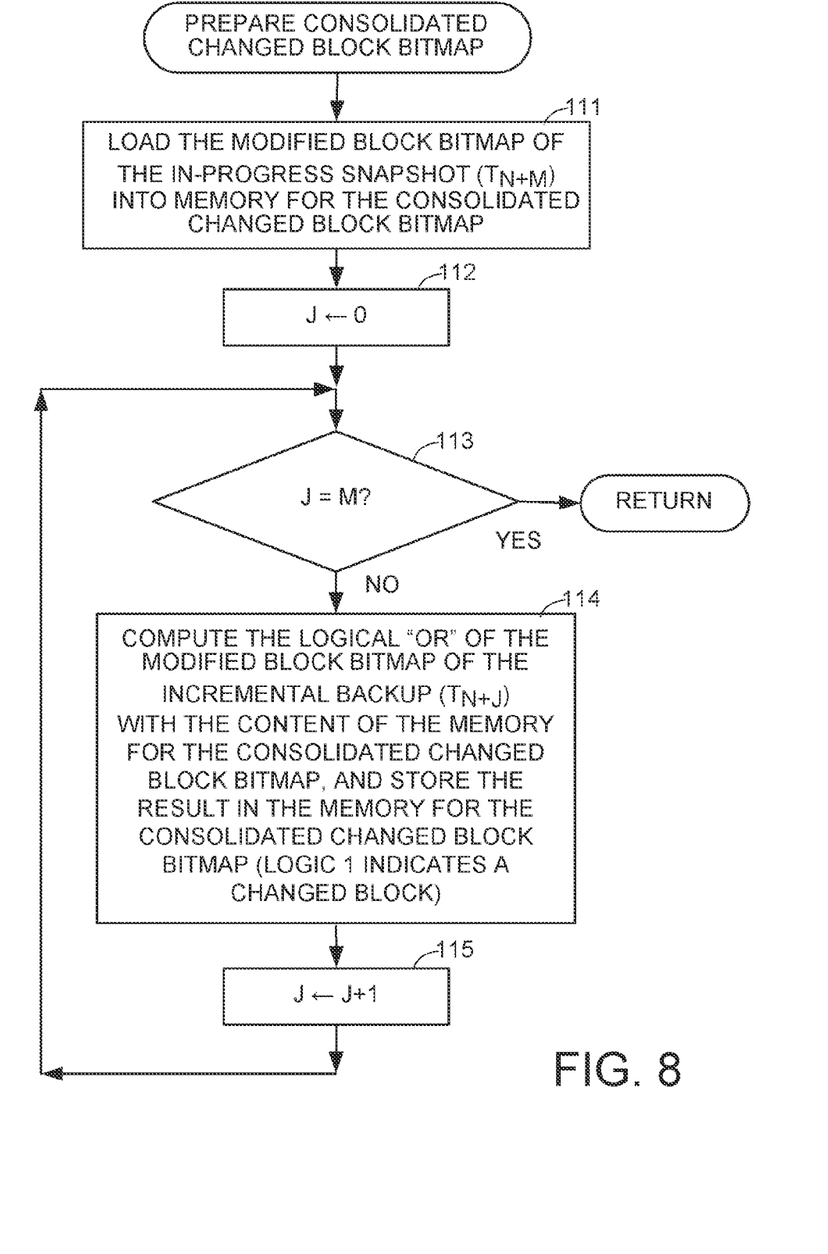
FIG. 8 illustrates a procedure for preparing a changed block bitmap for indicating blocks of the source volume that have changed since the selected backup.

Block 86 can be performed in various ways. In general, block 86 can be performed by successively scanning the in-progress snapshot and any and all incremental backups since $T_N$ for changed block tracking data indicating a change in the pointed-to block, and once any change is found, then execution continues to block 89, or else execution branches to block 87. If the changed block tracking data is in the form of a modified block bitmap for each of the in-progress snapshot and one or more incremental backups since $T_N$, then it may be advantageous to pre-compute a consolidated changed block bitmap so that only this consolidated changed block bitmap need be inspected in block 86 at the bit position of the pointed-to block to determine if the block has changed since $T_N$. For example, the consolidated bitmap is a logical combination of the changed block bitmap of the in-progress snapshot and the changed block bitmap of each of the incremental backups since $T_N$. This is shown in FIGS. 7 and 8 and further described below.

Figure 6:
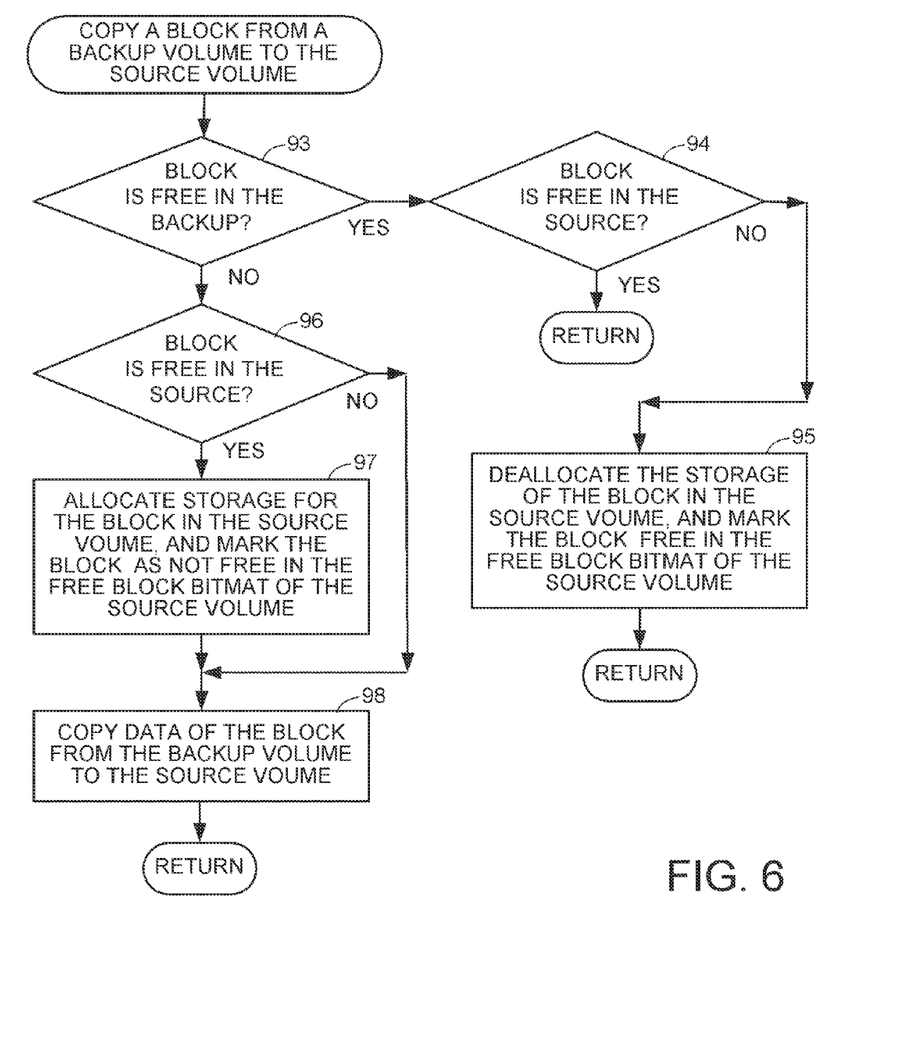
FIG. 6 illustrates a procedure for copying a block from a backup volume to the source volume.

In block 86, if the pointed-to block is invalid or the change block tracking data indicates that the pointed-to block has changed since $T_N$, then execution continues to block 89. In block 89, the incremental backups from $T_N$ to $T_1$ are successively scanned, in reverse chronological order, to find the most recent of any such change. If a change is found in the changed block tracking data of any of these incremental backups, then execution branches from block 90 to block 91. In block 91, the block is copied from the corresponding incremental backup to the source volume, in order to restore the block in the source volume to the time $T_N$. If the change to the block is the block becoming free, then this metadata of the block indicating that the block has become free is copied by setting the block in the source volume to a free state, and the block is de-allocated for the case of a the snapshot volume being a virtual dynamic or sparse volume. If the change to the block is new data being written to the block, then the block is copied by writing the new data for the block from the incremental backup to the source volume. A specific example is shown in FIG. 6 and further described below. Execution continues from block 91 to block 87.

In block 90, if a change to the block is not found in the incremental backups from $T_N$ to $T_1$, then execution continues to block 92. In block 92, the block is copied from the full backup ($T_0$) to the source volume, in order to restore the block in the source volume to the time $T_N$. Execution continues from block 92 to block 87.

In block 89, the scanning of the incremental backups can be done efficiently provided that the relevant block tracking data is almost always found in the cache memory (37 in FIG. 1) and the relevant block tracking data is efficiently indexed by the block pointer. The relevant block tracking data can almost always be found in the cache memory (37 in FIG. 1) provided that the number of relevant incremental backups is small or provided that the cache pre-fetching is tuned so that product of the pre-fetch size and the number of relevant incremental backups is less than the cache quota for the recovery process of FIG. 5. In this case, there should not be any significant cache preemption or "thrashing" of relevant pre-fetched changed block tracking data.

Although the changed block tracking data for the incremental backups has been shown as changed block bitmaps, another format for the block tracking data for incremental backups is an extent map of the changed blocks. For efficient indexing of extent maps, the extent maps should be in the form of extents sorted by offset (i.e., block number), and an extent pointer to a currently accessed extent in each extent map should be maintained in memory during the scanning process of blocks 86-92 for efficient lookup in the extent maps each time that the extent map is indexed with an incremented block pointer. For example, the block pointer is incremented in block 88, and each extent map is indexed with the incremented block pointer by checking whether the indexed block falls outside the current extent of contiguous blocks, and if so, the extent pointer is advanced to the next extent in the extent map, and then the block pointer is compared to the limits of this next extent to determine whether the extent map indicates that the block has changed in the incremental backup.

FIG. 6 shows an example of copying a block from a backup volume to the source volume. In a first block 92, the free block bitmap of the backup volume is inspected to determine if the block is free in the backup volume. If so, execution branches to block 94. In block 94, the free block bitmap of the source volume is inspected to determine if the block is free in the source volume. If so, the copying of the block is finished, and execution returns. Otherwise, execution continues to block 95. In block 95, the storage for the data of the block is deallocated in the source volume, and the block is marked free in the free block bitmap of the source volume. After block 95, the copying of the block is finished, and execution returns.

In block 93, if the block is not free in the backup volume, then execution continues from block 93 to block 96. In block 96, the free block bitmap of the source volume is inspected to determine if the block is free in the source volume. If so, execution continues to block 97. In block 97, storage for the block is allocated in the source volume, and the block is marked as not free in the free block bitmap of the source volume. Execution continues from block 97 to block 98. In block 98, data of the block is copied from the backup volume to the source volume. After block 98, copying of the block is finished, and execution returns.

In block 96, if the block is not free in the source volume, then execution branches to block 98 to copy data of the block from the backup volume to the source volume, and then execution returns.

FIG. 7 shows various ways that the methodology in FIG. 5 could be performed. For example, block 100 corresponds to block 81 of FIG. 5, and block 101 corresponds to block 82 of FIG. 5. In block 100, the snapshot copy facility is invoked to initiate a snapshot copy of the source volume in order to take the source volume offline. In block 101, if the source volume is not available to the restoration process, then execution branches to block 83 to restore the source volume without using any of the data in the source volume, because in this case no data is available from the source volume. Otherwise, execution continues from block 101 to block 102. In block 102, if valid and consistent snapshot changed block tracking data is available to the restoration process, then execution branches to block 103. In block 103, a consolidated changed block bitmap is prepared, as shown in FIG. 8 and further described below. Execution continues from block 103 to block 85, and execution continues from block 85 as shown in FIG. 5.

In block 102, if valid and consistent snapshot changed block tracking data is not available to the restoration process, then execution continues to block 104. In block 104, the volume snapshot facility is invoked to make an incremental backup (at time $T_R$). In block 105, if the volume snapshot facility is successful in making an incremental backup, then execution branches to block 103. In this case, block 103 would consolidate the changed block bitmap of the incremental backup ($T_R$) with the changed block bitmaps of any and all other incremental backups of the source volume since the time $T_N$, without including a changed block bitmap of an in-progress snapshot volume in this consolidation.

In block 105, if the volume snapshot copy facility is not successful in making an incremental backup, then execution continues from block 105 to block 106. In block 106, the volume snapshot copy facility is invoked to revert the source volume to the in-progress snapshot. Then, in block 107, if the volume snapshot copy facility is successful in reverting the source volume to the in-progress snapshot, then execution branches to block 103. In this case, block 103 would consolidate the changed block bitmaps of any and all incremental backups of the source volume since $T_N$, without including a changed block bitmap of an in-progress snapshot volume in this consolidation. In block 107, if the volume snapshot copy facility is not successful in reverting the source volume to the in-progress snapshot, then execution continues to block 83 in order to restore the source volume without using any of the data in the source volume.

FIG. 8 shows the preparation of a consolidated changed block bitmap for indicating blocks of the source volume that have changed since the selected backup. In this example, a bit in the changed block bitmap is set to a logical 1 to indicate a changed block. In a first block 111, the modified block bitmap of the in-progress snapshot ($T_{N+M}$) is loaded into memory allocated for the consolidated changed block bitmap. Next, in block 112, an index (J) is set to zero. Then, in block 113, the index (J) is compared to the number (M) of incremental backups to be included in the consolidation. If the index (J) equals this number (M), then execution returns. Otherwise, execution continues to block 114 to compute the logical "OR" of the modified block bitmap of the incremental backup ($T_{N+J}$) with the content of the memory for the consolidated changed block bitmap, and store the result in the memory for the consolidated changed block bitmap. (If a bit in the changed block bitmap would be set to a logical zero to indicate a changed block, then block 114 would compute the logical "AND" of the modified block bitmap of the incremental backup ($T_{N+J}$) with the content of the memory for the consolidated changed block bitmap, and store the result in the memory for the consolidated changed block bitmap.) This computation is efficient because the logical "OR" is performed on a word-by-word basis rather than a bit-by-bit basis. In other words, execution of a single machine instruction computes a result for a large number of blocks of the source volume. Execution continues from block 114 to block 115. In block 115, the index (J) is incremented by one, and then execution loops back to block 113.

FIG. 9 shows the restoration of the source volume to the time $T_N$ without using any data in the source volume by copying data blocks from the full backup ($T_0$) and the incremental backups ($T_1, T_2, \ldots, T_N$). This procedure uses sequences described above with respect to FIG. 5 and operates in a similar fashion. Blocks 121, 122, 123, 124, 125, 126, and 127 of FIG. 7 correspond to block 85, 90, 91, 87, 88, and 92 of FIG. 5, respectively. In general, the procedure of FIG. 9 scans the incremental backups in reverse chronological order from the time of the selected incremental backup ($T_N$) in order to search for a most recent version of each invalid block of the source volume in the backups from the time of the full backup ($T_1$) to the time of the selected incremental backup ($T_N$), and upon finding a most recent version of the invalid block of the source volume, copying, to the source volume, the most recent version found of the invalid block.

Although the backup and recovery operations have been described above with respect to a network server (21 in FIG. 1), the backup and recovery operations can be performed in other general purpose or specialized computing devices, such as personal computers, desktop or laptop computers, or mainframe computers, as well as cellular, wireless, and handheld devices running mobile software and capable of supporting a number of networking and messaging protocols. The backup and recovery operations can be performed in a system including any a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, SFTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also often include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for performing block-level recovery of a source volume to restore a source volume to the time of a selected incremental backup of the source volume by accessing changed block tracking data in a chronological series of backups of the source volume, the chronological series of backups of the source volume including a full backup followed by incremental backups of changed blocks of the source volume, the incremental backups including the selected incremental backup and at least one incremental backup following the selected incremental backup, and each incremental backup including block change tracking data identifying changed blocks of the source volume, the method comprising:

selecting a time of the selected incremental backup;

creating a map of the multiple valid blocks of the source volume, the map containing the changed block tracking data showing how each individual valid block has changed since the time of the selected incremental backup;

for each of the individual valid blocks of the multiple valid blocks of the source volume, separately performing the following:

(a) inspecting the changed block tracking data from after the time of the selected incremental backup to determine whether or not the individual valid block has changed in the source volume after the time of the selected incremental backup, and (b) keeping, in the source volume, the current individual valid blocks that when it is determined in (a) not to have changed since the time of the selected incremental backup, and (c) for the current individual valid blocks that is determined in (a) to have changed after the time of the selected incremental backup:

(i) locating the most recent version of each of the individual valid blocks at the time of the selected incremental backup;

(ii) copying to the source volume the most recent version of each of the valid blocks identified in (i);

wherein the method further includes initiating a snapshot copy of the source volume in order to take the source volume offline.

2. The computer implemented method of claim 1, wherein the incremental backups include at least one incremental backup after the full backup and before the selected incremental backup, and the locating includes scanning the incremental backups in reverse chronological order from the time of the selected incremental backup in order to search for the most recent version of each of the valid blocks determined in (a) to have changed since the time of the selected incremental backup.

3. The computer implemented method of claim 1, wherein the changed block tracking data since the time of the selected incremental backup includes changed block tracking data for an in-progress volume snapshot copy of the source volume in addition to changed block tracking data of every incremental backup following the selected incremental backup in the chronological series of backups of the source volume.

4. The computer implemented method of claim 1, wherein the method further includes creating a final incremental backup of the source volume so that the final incremental backup is a most recent incremental backup in the chronological series of backups of the source volume and the final incremental backup has a state consistent with the source volume.

5. The computer implemented method of claim 1, wherein the method further includes invoking a snapshot copy facility to revert the source volume to a state consistent with a most recent incremental backup in the chronological series of backups of the source volume.

6. A computing system, comprising:

at least one processor; and memory including instructions that, when executed by the at least one processor, cause the computing system to perform block-level restoration of a source volume to the time of a selected incremental backup of the source volume by accessing changed block tracking data in a chronological series of backups of the source volume, the chronological series of backups of the source volume including a full backup followed by incremental backups of changed blocks of the source volume, the incremental backups including the selected incremental backup and at least one incremental backup following the selected incremental backup, and each incremental backup including block change tracking data identifying changed blocks of the source volume, the restored source volume being restored by:

selecting a time of the selected incremental backup;

creating a map of the multiple valid blocks of the source volume, the map containing the changed block tracking data showing how each individual valid block has changed since the time of the selected incremental backup;

for each of the individual valid blocks of the multiple valid blocks of the source volume, separately performing the following:

(a) inspecting the changed block tracking data from after the time of the selected incremental backup to determine whether or not the individual valid block has changed in the source volume after the time of the selected incremental backup, and (b) keeping, in the source volume, the current valid blocks that is determined in (a) not to have changed since the time of the selected incremental backup, and (c) for current valid blocks that are determined in (a) to have changed after the time of the selected incremental backup:

(i) locating the most recent version of each of the current individual valid blocks at the time of the selected incremental backup; and (ii) copying to the source volume the most recent version of each of the valid blocks identified in (i);

wherein the instructions, when executed by the at least one processor, cause the computing system to initially initialize a snapshot copy of the source volume in order to take the source volume offline.

7. The computing system of claim 6, wherein the incremental backups include at least one incremental backup after the full backup and before the selected incremental backup, and the locating includes scanning the incremental backups in reverse chronological order from the time of the selected incremental backup in order to search for the most recent version of each of the valid blocks determined in s (a) to have changed since the time of the selected incremental backup.

8. The computing system of claim 6, wherein the changed block tracking data since the time of the selected incremental backup includes changed block tracking data for an in-progress volume snapshot copy of the source volume in addition to changed block tracking data of every incremental backup following the selected incremental backup in the chronological series of backups of the source volume.

9. The computing system of claim 6, wherein the instructions, when executed by the at least one processor, cause the computing system to initially create a final incremental backup of the source volume so that the final incremental backup is a most recent incremental backup in the chronological series of backups of the source volume, and so that the final incremental backup has a state consistent with the source volume.

10. The computing system of claim 6, wherein the instructions, when executed by the at least one processor, cause the computing system to initially invoke invoking a snapshot copy facility to revert the source volume to a state consistent with a most recent incremental backup in the chronological series of backups of the source volume.

11. A non-transitory computer readable storage medium storing one or more sequences of instructions executed by one or more processors to cause the one or more processors to perform block-level restoration of a source volume to the time of a selected incremental backup of the source volume by accessing changed block tracking data in a chronological series of backups of the source volume, the chronological series of backups of the source volume including a full backup followed by incremental backups of changed blocks of the source volume, the incremental backups including the selected incremental backup and at least one incremental backup following the selected incremental backup, and each incremental backup including block change tracking data identifying changed blocks of the source volume, the restored source volume being restored by:

selecting a time of the selected incremental backup;

creating a map of the multiple valid blocks of the source volume, the map containing the changed block tracking data showing how each individual valid block has changed since the time of the selected incremental backup;

for each of the individual valid blocks the multiple valid blocks of the source volume, separately performing the following:

(a) inspecting the changed block tracking data from after the time of the selected incremental backup to determine whether or not the individual valid block has changed in the source volume after the time of the selected incremental backup, and (b) keeping, in the source volume, the current valid blocks that is determined in (a) not to have changed since the time of the selected incremental backup, and (c) for current valid blocks that are determined in (a) to have changed after the time of the selected incremental backup:

(i) locating the most recent version of each of the current individual valid blocks at the time of the selected incremental backup; and (ii) copying to the source volume the most recent version of each of the valid blocks identified in (i);

wherein the instructions, when executed by the one or more processors, cause the one or more processors to initially initiate a snapshot copy of the source volume in order to take the source volume offline.

12. The non-transitory computer readable storage medium of claim 11, wherein the incremental backups include at least one incremental backup after the full backup and before the selected incremental backup, and the locating includes scanning the incremental backups in reverse chronological order from the time of the selected incremental backup in order to search for the most recent version of each of the valid blocks determined in (a) to have changed since the time of the selected incremental backup.

13. The non-transitory computer readable storage medium of claim 11, wherein the changed block tracking data since the time of the selected incremental backup includes changed block tracking data for an in-progress volume snapshot copy of the source volume in addition to changed block tracking data of every incremental backup following the selected incremental backup in the chronological series of backups of the source volume.

14. The non-transitory computer readable storage medium of claim 11, wherein the instructions, when executed by the one or more processors, cause the one or more processors to initially create a final incremental backup of the source volume so that the final incremental backup is a most recent incremental backup in the chronological series of backups of the source volume, and so that the final incremental backup has a state consistent with the source volume.

\* \* \* \* \*